US008634023B2

(12) United States Patent
Bridges et al.

(10) Patent No.: US 8,634,023 B2
(45) Date of Patent: Jan. 21, 2014

(54) SYSTEM FOR VIDEO FRAME SYNCHRONIZATION USING SUB-FRAME MEMORIES

(75) Inventors: Andrew Bridges, Markham (CA); Edouard Karam, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 470 days.

(21) Appl. No.: 12/840,955

(22) Filed: Jul. 21, 2010

(65) Prior Publication Data

US 2011/0019089 A1 Jan. 27, 2011

Related U.S. Application Data

(60) Provisional application No. 61/227,417, filed on Jul. 21, 2009, provisional application No. 61/227,711, filed on Jul. 22, 2009.

(51) Int. Cl.
*H04N 7/01* (2006.01)

(52) U.S. Cl.
USPC ......................................... 348/441

(58) Field of Classification Search
USPC .................. 348/714–719, 536, 537, 441–458
See application file for complete search history.

(56) References Cited

U.S. PATENT DOCUMENTS 6,088,391 A * 7/2000 Auld et al. ............... 375/240.15
6,141,055 A * 10/2000 Li ............................... 348/446
6,630,962 B2 * 10/2003 Clerc et al. ................... 348/459
7,034,812 B2 * 4/2006 Chen et al. ................... 345/204
7,091,944 B2 * 8/2006 Wang .............................. 345/100
7,830,450 B2 * 11/2010 Gong et al. ................... 348/459
2002/0078317 A1 * 6/2002 Yasoshima ..................... 711/171
2003/0156639 A1 * 8/2003 Liang ....................... 375/240.01
2004/0212734 A1 * 10/2004 MacInnis et al. ............. 348/536
2005/0122341 A1 * 6/2005 MacInnis et al. ............. 345/558
2007/0040946 A1 * 2/2007 Nagakura et al. ............. 348/714
2007/0140398 A1 * 6/2007 Inoue et al. ................... 375/372
2008/0136966 A1 * 6/2008 Hashimoto ................... 348/500
2008/0165268 A1 * 7/2008 Takahashi et al. ........ 348/333.01
2008/0198153 A1 * 8/2008 Yu et al. ....................... 345/214
2011/0188580 A1 * 8/2011 Valmiki et al. ........... 375/240.24

* cited by examiner

*Primary Examiner* — Jefferey Harold
*Assistant Examiner* — Humam Satti
(74) *Attorney, Agent, or Firm* — Haynes and Boone, LLP (57) ABSTRACT

A circuit and a method of using the circuit for video frame synchronization are provided. The circuit includes a memory having a capacity less than a full video frame and a "first in first out" (FIFO) interface controlling the memory, further removing the post-read buffer in the memory, and overwriting the post-read buffer in the memory with new data. Some embodiments of the circuit for video frame synchronization provide a wide data bus having a high bandwidth interface to the memory circuit to allow reduced memory clock rate. Some embodiments of the circuit further include a processor that produces a clock signal and measures an input data rate. The processor controls the FIFO interface to generate an output data stream at a preselected frequency, with a preselected phase. More generally, other embodiments of the present invention provide a circuit wherein the processor may be used as a data rate converter and video input timing aberration filter.

16 Claims, 6 Drawing Sheets

SYSTEM FOR VIDEO FRAME SYNCHRONIZATION USING SUB-FRAME MEMORIES

CROSS-REFERENCE TO RELATED APPLICATIONS

This application relates and claims priority to U.S. Provisional Patent Application No. 61/227,417, filed Jul. 21, 2009, the disclosure of which is incorporated herein by reference, as if fully stated here, for all purposes. This application also relates and claims priority to U.S. Provisional Patent Application No. 61/227,711, filed Jul. 22, 2009, the disclosure of which is incorporated herein by reference, as if fully stated here, for all purposes.

BACKGROUND

1. Field of the Invention

The embodiments described herein relate generally to video processing circuits and methods, and more particularly to video frame synchronization using sub-frame memories.

2. Description of Related Art

Modern video processing circuits support an increasingly large array of input and output video timing formats. There are several problems presented for these processing circuits. First, pixel data rate conversion requires memory storage having a high bandwidth interface to contain pixel data written at an input rate and then read back at a different output rate. For example, the video timing formats range from the legacy standard-definition television video (SDTV) to the modern ultra-high definition television (UHDTV). The pixel sample and clock rate of video synchronization timing varies between these formats from the original 13.5 Mega Hertz (MHz) timing in SDTV applications to 350+ MHz in UHDTV applications. Modern video systems often handle the conversion of pixel and clock rates between formats that differ in pixel rate by up to 50 times from one format to another. Furthermore, a conversion from a pixel processing rate to a video standard rate, or from a video standard rate to a pixel processing rate may be required by a system.

Second, the capture of active data lines within an input format delivered over a specific time interval is converted to a display output format with active lines of data delivered over a different time interval. This conversion can involve an extensive use of memory storage and a significant increase in processing latency.

Third, filtering of video input timing aberrations, or "jitter," in the received clock and input timing signals, requires further buffering to filter the jitter and achieve an averaged, constant output rate. The passing of jitter through a system from its input to its output is undesirable, can lead to standards timing non-compliance, and can result in the failure to operate downstream system components.

Traditional video synchronization systems utilize external dynamic RAM (DRAM) as a frame buffer memory. This frame buffer captures input video at an input rate and displays output video at a display rate and is used to resolve the three problems listed above. However, this external frame buffer is expensive, and may be limited by technical or cost driven capacity and bandwidth constraints.

What is needed is a frame buffer solution that achieves a reduction in storage requirements to resolve the above problems.

SUMMARY

A circuit and a method of video frame synchronization are provided. The circuit includes a memory circuit having a capacity less than a full video frame and a "first in first out" (FIFO) interface, the FIFO interface retiring the post-read buffer data in the memory and overwriting the post-read buffer data in the memory with new data. Some embodiments of the circuit for video frame synchronization provide a memory comprising a sub-frame memory. Some embodiments of the circuit further include a processor that affects data rate conversion by measuring and controlling the modulation of an input data write rate to the memory. The processor also controls the FIFO interface to generate an output data stream at a preselected frequency with a preselected phase.

Furthermore, some embodiments of the present invention may reduce the clock rate at which the memory is operated to take advantage of a wide bus, high bandwidth interface of a memory circuit. Contrary to a classic external SDRAM memory interface that may be restricted in data bus width and may be ran at high frequency to deliver the same interface bandwidth.

More generally, other embodiments of the present invention provide a circuit wherein the processor may be used as a data rate converter and video input timing aberration filter. These and other embodiments of the present invention are further described below with reference to the following figures.

In the figures, elements having the same designation have the same or similar functions.

DETAILED DESCRIPTION

Digital circuits that are capable of processing video signals utilize memory buffers to manage the difference between input and output video rates and also to manage the difference between input and output data intervals. Data received within a specific data interval is processed and then displayed at a specific (possibly different) data interval size and relative phase. A method and a circuit for providing a video synchronization system are disclosed. The system and circuitry can be used in digital systems that support differing input, processing, and output video formats. Some embodiments of the present invention may support different input and output video formats, and may be able to handle video signals ranging from a few MHz, as in SDTV signals, to several hundreds of MHz, as in HDTV signals. Furthermore, a system and a circuit for video frame synchronization according to some embodiments of the present invention may use memory storage more efficiently than prior art, reducing process latency and reducing the required storage capacity. Also, some embodiments of the present invention may be provided such that timing or "jitter" aberrations can be filtered out of the received clock and the timing signals. In some embodiments, the method and circuit provided make use of a very wide bus memory capable of handling many parallel bits of video data simultaneously. In some embodiments, a large memory storage directly connected inside the integrated circuit used for video frame synchronization can be utilized. The use of an embedded memory buffer in some embodiments allows the memory storage to be clocked at a relatively slow rate, simplifying the design of the system, and reducing its power consumption.

Figure 1:
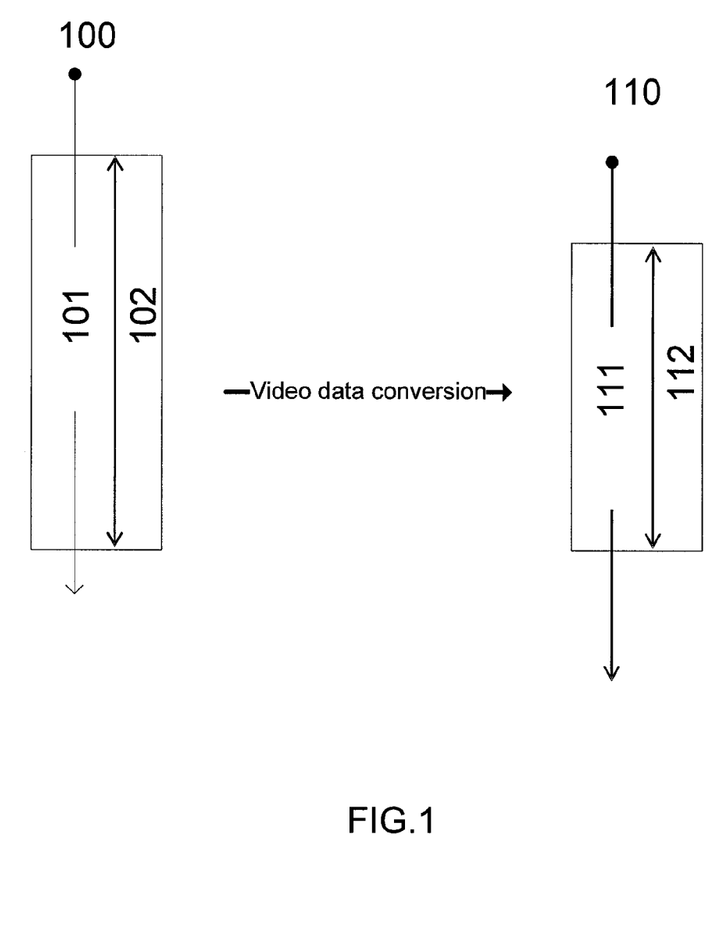
FIG. 1 illustrates an input active data interval conversion to a shorter active data interval.

FIG. 1 shows a general schematic of video data conversion according to some embodiments of the present invention. In particular, FIG. 1 illustrates a display interval conversion between input display interval 100 and output display interval 110. Input display interval 100 may include input time interval 101 and input data interval 102. Likewise, output display interval 110 may include output time interval 111 and output data interval 112. The difference in time between a 'time interval' and a 'data interval' accounts for a 'vertical blanking time' interval, which is the time in between video frames during which no video signal is displayed on the display. In the embodiment depicted in FIG. 1, input and output data intervals 102 and 112 may be defined in terms of pixel lines, or more generally, data lines. The length and structure of output data interval 112 is predetermined by the video output format. In some embodiments, output data interval 112 may include a greater or fewer number of data lines than input data interval 102.

In general, the video data conversion shown in FIG. 1 utilizes a memory buffer to store the data of the input video frame, and a processing unit that controls the storage of the input data in the memory and performs data readout according to a pre-selected output video frame format and corresponding average pixel rate. The converse may also be implemented where the input is written at average rate corresponding to a pre-selected video input format and where the readout is controlled by the processing unit.

In some embodiments, a small quantity of high-bandwidth embedded memory may be utilized using a FIFO ("First in, first out") configuration. Using embedded memory in a FIFO configuration requires only a fraction of the entire video frame ('sub-frame' memory) in contrast to other embodiments that require full size, off-chip memory buffers that store the entire video frame. The application of this FIFO may include, for example, jitter filtering and data rate conversion between signals having SDTV format and signals having HDTV format A high-bandwidth embedded memory may operate at lower clock rates and therefore may consume considerably less system power than systems using an external memory or operating an internal memory at full clock rate. Reducing the memory operating frequency may reduce the power consumption associated with switching rates of the interface and the read/write preconditioning operations within the memory, according to some embodiments of the present invention. The clock rate at the interface of a high bandwidth embedded memory may be reduced to a fraction of the memory data access rate. The reduction ratio may be proportional to the ratio between the available memory bandwidth and the bandwidth required by the video application, according to some embodiments of the present invention. For example, some embodiments of the present invention may use a video read and write access bandwidth of 9.504 Gbit/s. This type of bandwidth may be used in two (2) standard video streams of uncompressed data in a format having 1080 pixel/line at 60 Hz. Then, a 256-bit wide embedded memory interface operating at 200 MHz providing up to 51.2 Gbits/s of available bandwidth may be reduced to operate at 200 MHz×(9.504 Gbit/s/51.2 Gbit/s) which is about 37 MHz.

Embedded memories in a FIFO configuration may be implemented using smaller storage capacity and therefore may reduce systems cost and consume less system power than systems that do not utilize a FIFO configuration. Specifically, reducing memory capacity may reduce the leakage power consumption in some embodiments of the present invention. Further, some embodiments of the present invention may use reduced dynamic power consumption. Some embodiments of the present invention may also reduce the cost associated with circuit area.

As illustrated in FIG. 1, data received at a particular pixel rate may be processed and converted to a different format having a higher or a lower pixel resolution than the input format, thus increasing or decreasing the amount of memory buffering utilized, respectively. If the design stores a full frame of data in memory, then a large input or output resolution may utilize large amounts of buffering. For example, some embodiments of the present invention may use a full frame of standard video format 1080 pixels at 30 bits per pixel using a system designed with a 32-bit memory interface granularity will require 8.3 Mbytes of storage per frame of data.

Figure 2:
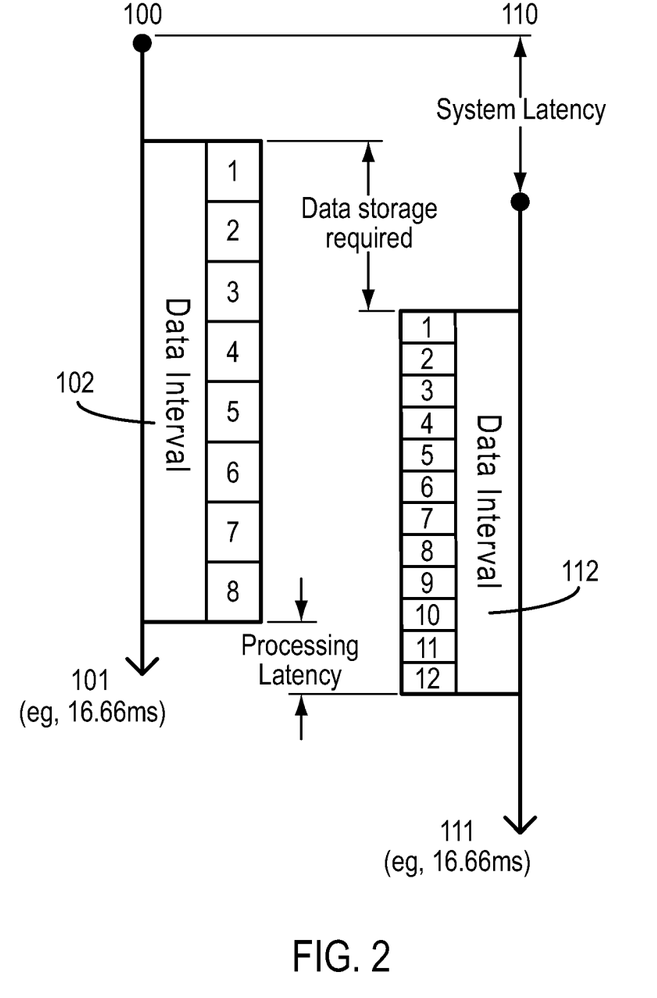
FIG. 2 illustrates a data rate conversion from an eight (8) line input to a twelve (12) line output over a reduced data interval.

The example in FIG. 2 illustrates in more detail a video data conversion according to some embodiments of the present invention. Input frame time 101 is shown with its respective data interval 102. Output frame time 111 is shown with its respective data interval 112. Input time interval 101 may have the same duration as output time interval 111, according to some embodiments of the present invention. In general, the real time size of a data interval, the number of lines (vertical resolution), and the number of pixels per line (horizontal resolution) may be defined by the video timing standards in some embodiments of the present invention. Note that output data interval 112 may be smaller or larger than input data interval 102, even if the output frame may have a higher resolution than the input frame, in some embodiments of the present invention. As input video lines are received by the system depicted in FIG. 2, they are written/stored into a sub-frame memory buffer (i.e. of capacity less than one frame of storage); then they are read from the buffer and sent to a video display according to the video output timing format. Factors that may contribute to the minimum amount of required storage are the real time difference in size of input data interval 102 and output data interval 112, and the real time maximum amount of jitter in data interval 102. Further factors affecting the minimum amount of storage used may be the number of lines used by an application-specific processing function before which a line of output can be generated. For example, input data interval 102 may include a video frame having eight (8) lines, converted to an output data interval 112 including a video frame having twelve (12) lines. If the system buffers input lines, then all factors contributing to the storage requirements must be calculated in terms of input line times. For example, in some embodiments the difference in the input versus output data interval, the processing latency, and the maximum input jitter may be two (2) input line times, one (1) input line time, and one (1) input line time, respectively. Then, the required capacity of the buffer may be four (4) input lines of active pixel data. In some embodiments of the present invention, the system may buffer output lines. Then, all factors contributing to the storage requirements must be calculated in terms of output line times. For example, in some embodiments of the present invention the difference in the input versus output data interval, the processing latency, and the maximum input jitter may be equal to five (5) output line times, two (2) output line times, and two (2) input line times, respectively. Then, the required capacity of the buffer may be nine (9) output lines of active pixel data.

The embodiment depicted in FIG. 2 may further include conversion between all video formats, including those from SDTV through UHDTV, indicated above. Some embodiments of the present invention may be implemented to service multiple input/output format combinations. In some embodiments using multiple input/output format combinations, it is the combination that yields the largest used storage that determines the real buffer size that may be used by the system. Minimum system latencies observed at the output may result from the number of lines stored in the buffer plus the processing latency, in terms of output lines.

Figure 3:
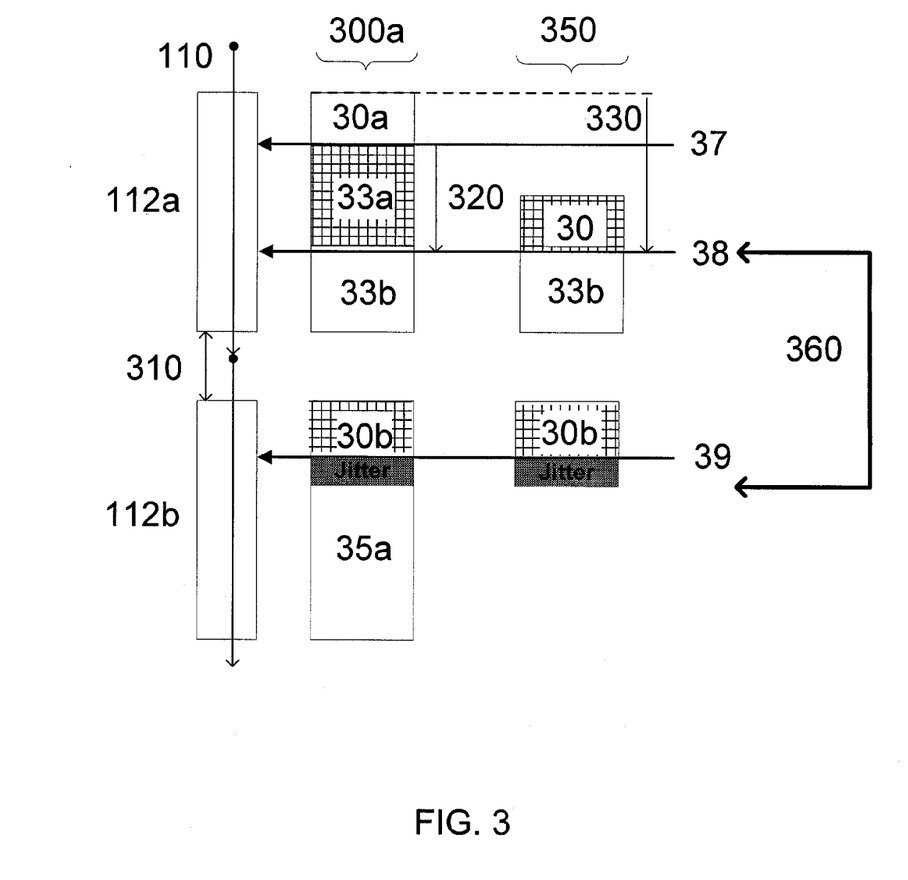
FIG. 3 illustrates an embodiment of the present invention that demonstrates a reduced storage requirement.

FIG. 3 shows a snapshot of time within the flow of data in a video frame synchronization system according to some embodiments of sub-frame embedded memory system 350 disclosed herein, as compared to classical full frame memory system 300a. Output display interval 110 depicts the flow of data including first output frame 112a to be read from a memory buffer and second output frame 112b to be concurrently written to the memory buffer, both separated by blanking time 310. After reading a portion 30a of the output video frame, full frame memory buffer 300a has a read pointer 37 which lags behind read pointer 38 of embedded memory buffer 350 because read pointer 37 starts reading the data from interval 112a only after the full frame in interval 112a has been loaded into memory buffer 300a. In contrast, FIFO interface 350 immediately retired post-read buffer storage 30 in embedded memory 350 such that the retired storage has been immediately overwritten with data 30b from frame 112b. The resulting time lapse between read pointer 37 in off-chip memory 300a and read pointer 38 in embedded memory buffer 350 corresponds to latency improvement 320 of the operation of sub-frame memory 350, as compared to full frame memory 300a. Furthermore, embedded memory system 350 may only have portion 33b of the input video frame to be read before completion. Whereas full-frame memory system 300a may have a larger portion of the input video frame to be read before completion, namely 33a plus 33b. In addition to latency improvement 320 attributed to the FIFO configuration of system 350, data storage improvement 33a corresponding to the latency improvement may also result, according to some embodiments of the present invention.

FIG. 3 further contrasts the two memory systems 300a and 350, showing the write data flow of an input video frame 112b to a memory buffer. Portion 30b of the input frame may be written by memory systems 300a and 350, according to some embodiments of the present invention. Further, memory system 350 may allocate sufficient reserve buffering to accommodate the maximum input jitter margin in some embodiments. In contrast, full-frame memory system 300a may need to provide sufficient memory to accommodate portion 35a of the frame not yet written, as well as the maximum jitter margin.

According to some embodiments of the present invention such as depicted in FIG. 3, embedded memory buffer 350 may be substantially smaller than full-frame sized memory buffer 300a. In one example, full-frame memory system 300a may use a capacity of 126.6 Mbits (=126.6×10$^6$ bits). This capacity may enable a system to support two 1080p standard video frames (one write buffer 112b plus one read buffer 112a) with a 32 bit/pixel memory write granularity may use a maximum operational bandwidth of 10-20 Gbits/s. Embedded memory system 350, according to some embodiments of the present invention, may use a reduced capacity of 6 Mbits (=6×10$^6$ bits) of data (a FIFO containing 33b, 30b, and jitter margin) with a maximum operational bandwidth of 25.5 Gbits/s and still be able to support the same two 1080p standard video frames. In this example, embedded memory system 350 may process the same video data using a fraction <1/20th (i.e. 6 Mbits/126.6 Mbits) of the memory capacity required by full-frame memory system 300a. Thus, the use of embedded memory may save the cost of an external memory system and corresponding interface, according to some embodiments of the present invention.

Figure 4A:
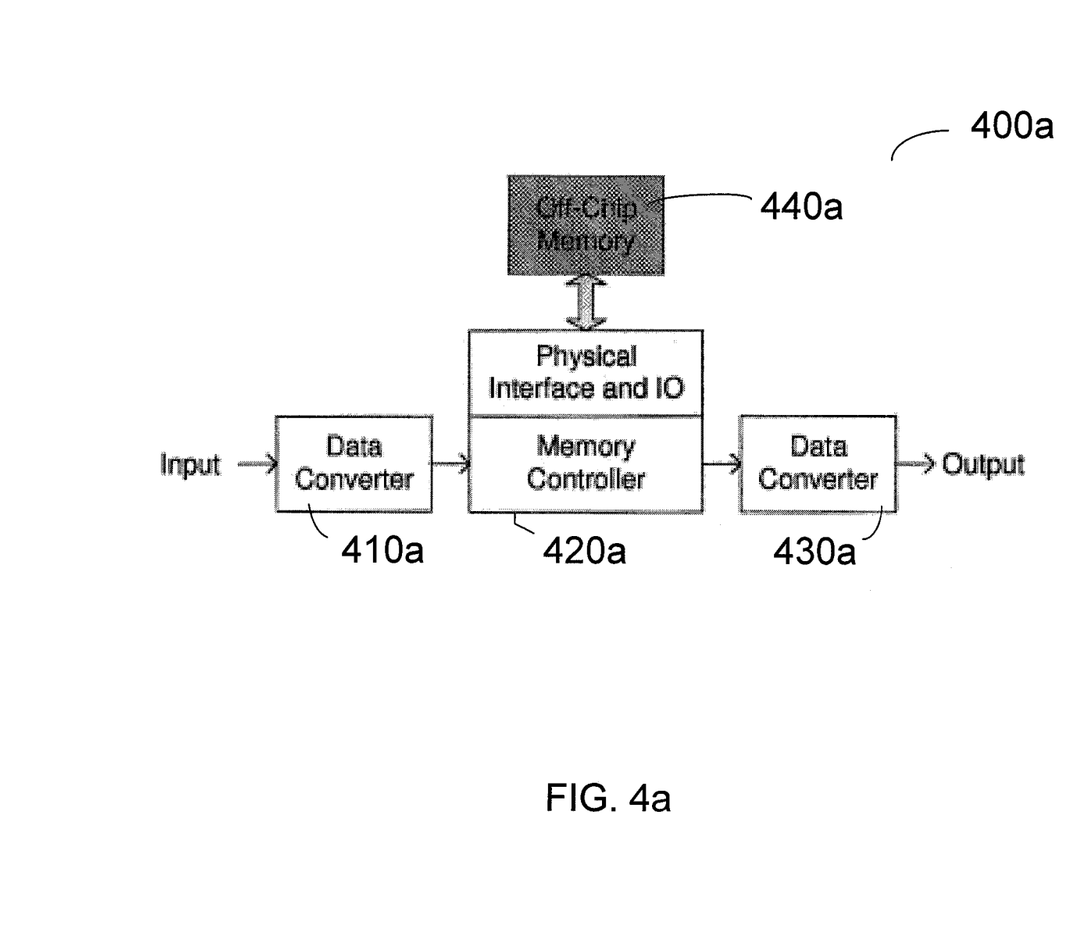
FIG. 4a illustrates an embodiment of a video frame synchronization conversion using an off chip memory architecture.

FIG. 4a shows off-chip memory architecture 400a used for a video frame synchronization system. Data converter 410a receives the input video signal and converts it into a format that is accessible to off-chip memory 440a. Memory Controller 420a manages the access of data to and from external memory devices 440a and may introduce latency in the system. The data read from external memory 440a, is sent to data converter 430a, through memory controller 420a. Data converter 430a converts the signal from a format compatible with off chip memory 440a into a preselected output format. For example, data converter 430a may convert between the off-chip memory 440a data rates and the desired output pixel rates. The cost of a high bandwidth interface to and from an external storage is significant as this may include the external memory devices 440a, and the on chip physical interface and controller 420a.

Figure 4B:
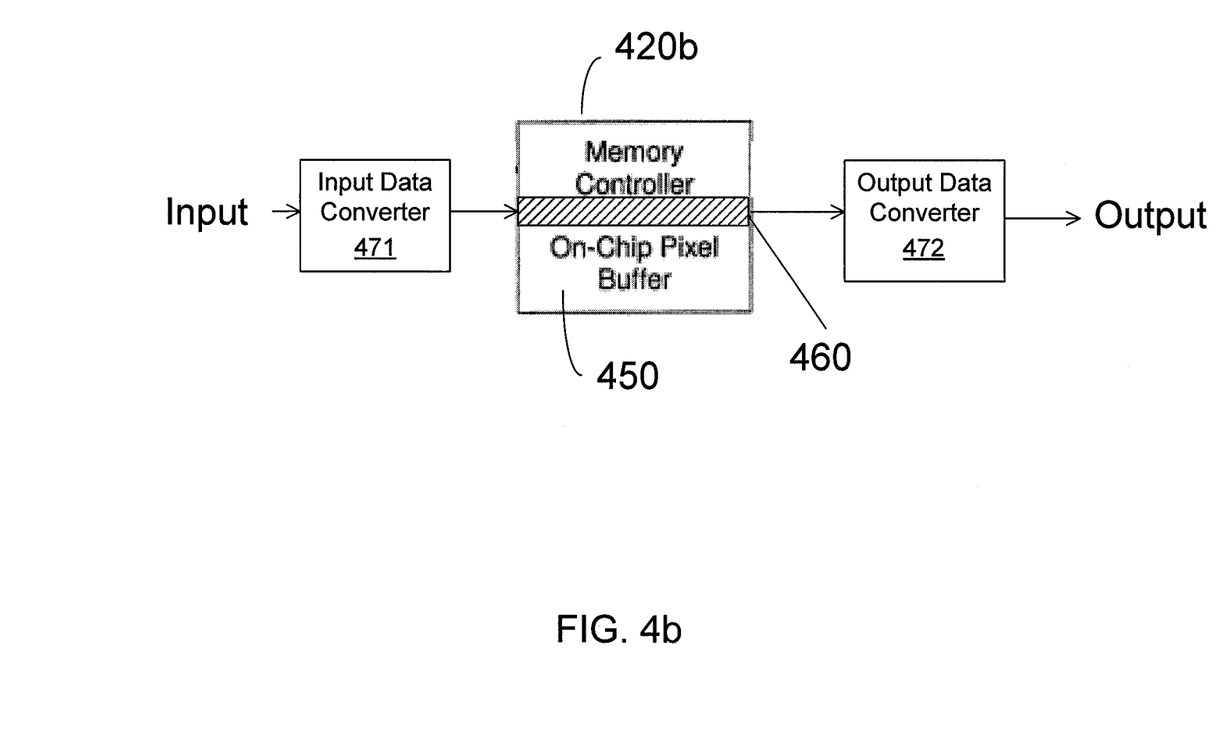
FIG. 4b illustrates an embodiment of the invention comprising an embedded (on-chip) memory buffer.

FIG. 4b shows a video frame synchronization system according to some embodiments of the present invention. As shown in FIG. 4b, the video frame synchronization system includes input data converter 471 and output data converter 472. Some embodiments of the present invention further include an on-chip embedded memory buffer 450, also referred to as pixel buffer 450. This embodiment eliminates the need for off chip memory 440a and the physical interface portion of its controller 420a. Note that memory controller 420b is a processing unit that controls access of data into and from on-chip memory 450 according to commands from FIFO interface 460.

Figure 5:
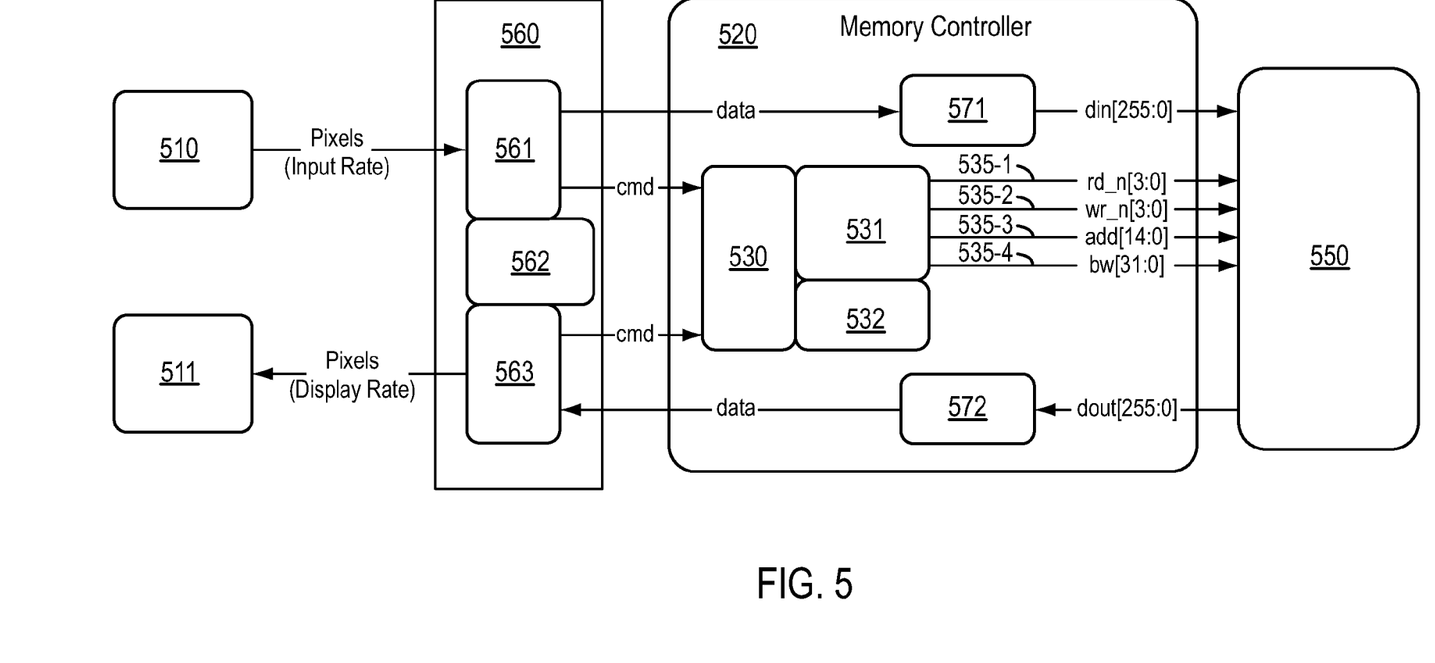
FIG. 5 illustrates a block diagram of an embedded memory circuit according to some embodiments of the present invention.

FIG. 5 shows a video frame synchronization system on a chip in accordance to some embodiments of the present invention. As shown in FIG. 5, memory controller 520 is coupled to on-chip embedded memory 550 so that an input pixel stream is received and converted to a wide bit-width interface for storage and retrieval to and from embedded memory device 550. Pixel data is received from video input or processor 510 at a first pre-determined average input rate and over an interval corresponding to the received video standard format. The pixel data is sent out to video display or processor 511 at a second pre-determined average display rate and over an interval corresponding to the display video standard format. Input and output data are handled by FIFO interface 560, which includes 'Write Client' block 561 and 'Read Client' block 563 to aggregate data for transfer to and from memory controller 520, respectively. In some embodiments of the present invention, FIFO interface 560 may includes pixel controller 562 to control 'pixel read' pointer 38 and 'pixel write' pointer 39 in embedded memory 550 (cf. FIG. 3). FIFO controller 562 may monitor the present read address and command applied by 'Read Agent' block 563 to block 530 and grants corresponding write permission to the 'Write Agent' 563 whenever sufficient capacity in the memory buffer is available to be written. The FIFO controller 562 is configured to monitor the memory buffer's instantaneous fullness state, denying 'Read Agent' 563 access to the buffer when the FIFO is empty and denying 'Write Agent' 561 access to the memory when the FIFO is full. Memory controller 520 performs all timing and control functions for the 'read' and 'write' operation of the embedded memory devices. Controller 520 includes arbiter block 530, which receives commands from 'Write Client' block 561 and 'Read Client' block 563 to position read and write pointers 38 and 39 (cf. FIG. 3) on embedded memory 550. The positioning of read and write pointers 38 and 39 is translated into address information native to the connected memory 550 by address command decoder 531. Strings 535-1 (rd_n), 535-2 (wr_n), 535-3 (add), and 535-4 (bw) may be provided by block 531 according to some embodiments of the present invention. Strings 535-1 to 535-4 show a collection of control signals that may provide native read command 535-1, write command 535-2, bank address command 535-3, and bank select command 535-4, using the protocols native to a specific implementation of memory 550. The specific command string used for control of the memory 550 may include any of numerous protocols, specific to the embedded memory selected for that embodiment. Memory controller 520 may include Block 532 as a housekeeping controller that implements functions that may include memory startup, shutdown, and refresh control, according to some embodiments of the present invention.

In some embodiments of the present invention data may be transferred to and from embedded memory 550 at a reduced rate commensurate with the increased data-width of the embedded memory available.

Controller 520 may also include block 571 in some embodiments of the present invention. Block 571 may write a data path to the input data string. The resulting data string may include any number of bits; in particular, some embodiments of the present invention may include 256 bits to be stored in embedded memory 450. Block 572 reads the data path from the output data string in embedded memory 450, which is to be sent to output device 511.

Embodiments of the invention described above are exemplary only. One skilled in the art may recognize various alternative embodiments from those specifically disclosed. Those alternative embodiments are also intended to be within the scope of this disclosure. As such, the invention is limited only by the following claims.

What is claimed is:

1. A circuit for video data conversion comprising:
a video frame synchronizer including a memory circuit having a FIFO interface;
wherein the video frame synchronizer is configured to:
receive input video data having an input data rate and an input data interval associated with an input frame time;
temporarily store the input video data using the memory circuit; and
generate output video data having an output data rate and an output data interval associated with an output frame time;
wherein the memory circuit has a capacity less than a full video frame wherein the capacity is determined based on a difference between the input data interval and the output data interval and a maximum input jitter in the input data interval;
wherein the FIFO interface is configured to retire a post-read buffer in the memory circuit and overwrite the post-read buffer in the memory circuit with new data from the input video data.

2. The circuit of claim 1 further wherein the memory circuit comprises an embedded memory circuit.

3. The circuit of claim 1 further comprising:
a processor that produces a clock signal and measures the input data rate and controls the FIFO interface to generate the output video data at a preselected frequency, with a preselected phase.

4. The circuit of claim 3 wherein the processor serves as a data rate converter and a video input timing aberration filter.

5. The circuit of claim 1 further wherein the capacity is $1/10^{th}$ of a full video frame or less.

6. The circuit of claim 1 further comprising:
a wide data bus having a high bandwidth interface to the memory circuit to allow a reduced clock rate for the memory circuit.

7. A method for video frame synchronization comprising:
receiving an input video signal having an input data rate and an input data interval associated with an input frame time;
writing the input video signal into a memory circuit having a FIFO interface;
using the FIFO interface to retire a post-read buffer in the memory circuit, and overwrite the post-read buffer with new data from the input video signal;
using a processor for writing an output video signal having an output data rate and an output data interval associated with an output frame time;
wherein the memory circuit has a capacity less than a full video frame wherein the capacity is determined based on a difference between the input data interval and the output data interval and a maximum input jitter in the input data interval.

8. The method of claim 7, further wherein the memory circuit comprises an embedded memory circuit.

9. The method of claim 7, further wherein the capacity is $1/10^{th}$ of a full video frame or less.

10. The method of claim 9, further comprising using the processor to convert the input data rate into the output data rate; and
using the memory circuit for correcting time aberrations or jitter in the input video signal.

11. The circuit of claim 1, further wherein the input data interval and the output data interval are the same.

12. The circuit of claim 1, further wherein the capacity is further determined based on a processing latency of the video frame synchronizer.

13. The circuit of claim 5, further wherein the capacity is $1/20^{th}$ of the full video frame or less.

14. The method of claim 7, further wherein the input data interval and the output data interval are the same.

15. The method of claim 7, further wherein the capacity is further determined based on a processing latency of the processor.

16. The method of claim 9, further wherein the capacity is $1/20^{th}$ of the full video frame or less.

* * * * *